(No Model.) 2 Sheets—Sheet 2.
F. S. RUTTMANN & G. SINGER.
TRIPOD.
No. 368,426. Patented Aug. 16, 1887.
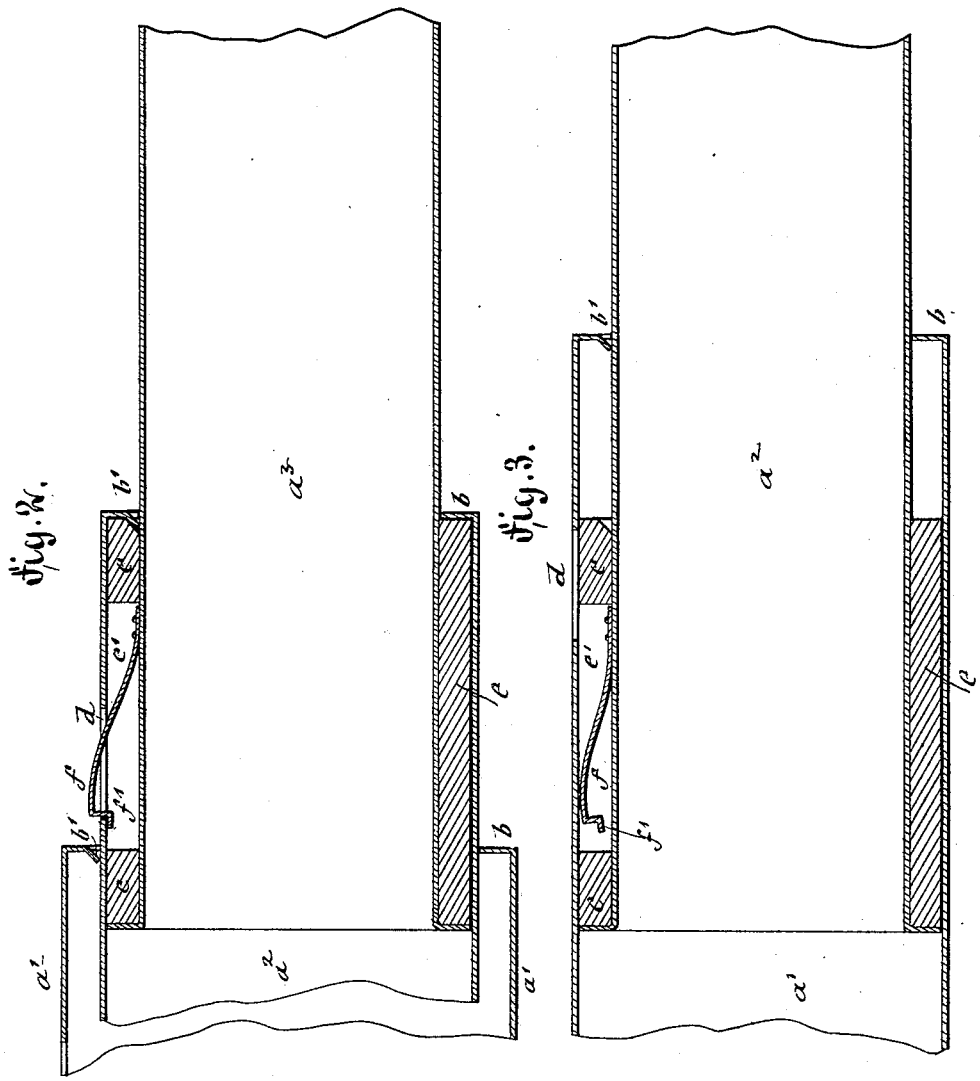
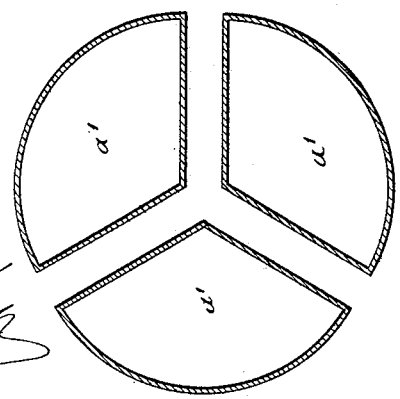
WITNESSES:
INVENTOR
Ferdinand S. Ruttmann
and George Singer
BY Goepel & Raegener
ATTORNEYS.
N. PETERS, Photo-Lithographer, Washington, D. C.

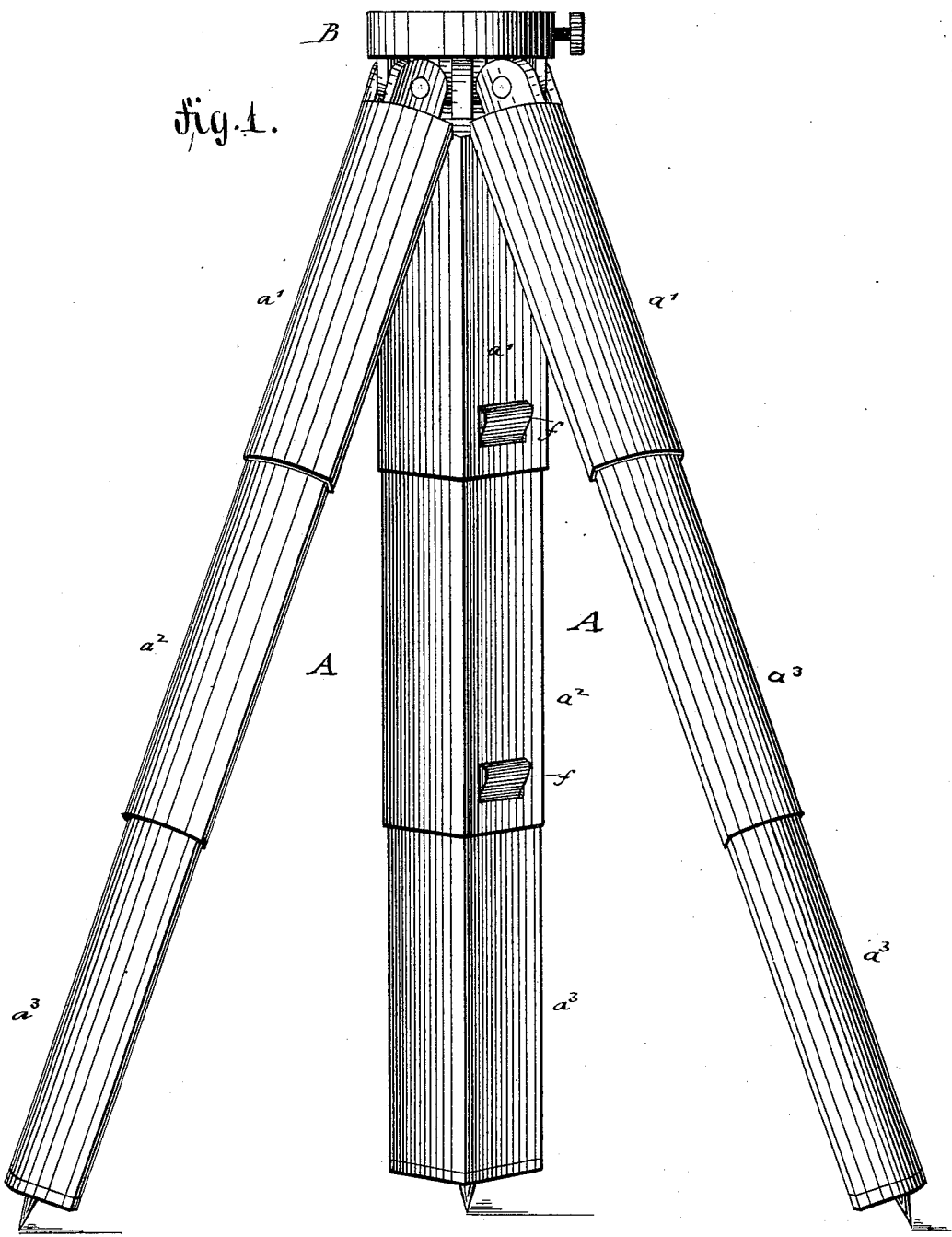

UNITED STATES PATENT OFFICE.

FERDINAND S. RUTTMANN, OF PLAINFIELD, NEW JERSEY, AND GEORGE SINGER, OF PITTSBURG, PENNSYLVANIA.

TRIPOD.

SPECIFICATION forming part of Letters Patent No. 368,426, dated August 16, 1887.

Application filed November 13, 1886. Serial No. 218,758. (No model.)

*To all whom it may concern:*

Be it known that we, FERDINAND S. RUTTMANN, of Plainfield, county of Union, State of New Jersey, and GEORGE SINGER, of Pittsburg, in the county of Allegheny and State of Pennsylvania, have invented certain new and useful Improvements in Tripods, of which the following is a specification.

This invention relates to an improved tripod for photographic cameras and other purposes, the tripod being arranged with telescoping legs, so as to be conveniently carried and shipped; and the invention consists of a tripod the legs of which are formed of tubular telescoping sections, each section being of sector-shaped cross-section, said sections being locked to each other when extended by inwardly-extending flanges and slots at the lower ends of the upper and middle sections, fixed and slotted collars at the upper ends of the middle and lower sections, and locking-springs located in the slots of said collars and adapted to engage the ends of the adjoining sections, all as will be fully described and set forth hereinafter, and finally be pointed out in the claims.

In the accompanying drawings, Figure 1 represents a perspective view of our improved tripod for photographic cameras. Figs. 2 and 3 are vertical longitudinal sections drawn on a larger scale, showing the connection of the telescoping sections of the legs of the tripod; and Fig. 4 represents a horizontal section through the legs of the tripod, showing the shape of the same.

Similar letters of reference indicate corresponding parts.

Our improved tripod is constructed of the legs A, which are made of three or more telescoping sections, $a'\ a^2\ a^3$, that are made of stiff sheet-steel or other sheet metal, so as to combine both strength and lightness. The upper section of each leg is hinged in the usual manner to the head B of the tripod, while the lower sections are provided with the usual pointed ends. The sections of the legs are made sector-shaped in cross-section, the sector being one-third of a circle, as shown in Fig. 4, each succeeding section being smaller than the preceding, in order to telescope into the preceding section. The legs, when telescoped and folded, form a body of cylindrical shape the length of the first section. The lower ends of the uppermost sections, $a'$, are provided with inwardly-bent flanges $b$, and at one of their straight sides with slots $d$. The adjoining upper ends of the intermediate sections, $a^2$, and lowermost sections, $a^3$, are provided with metallic collars $e$, also of sector-shaped cross-section, which are provided at that side adjoining the slots $d$ of the sections $a'\ a^2$ with slots $e'$ in line with the slots $d$. In the slots $e'$ locking-springs $f$ are arranged, which are attached at one of their ends to the sections $a^2\ a^3$, respectively, and provided at their free ends with an L-shaped catch, $f'$, by which said springs bear against one end of the slots $d$ when the same are permitted to project through the same, as shown in Fig. 2, for locking the sections $a'\ a^2$ or $a^2\ a^3$ in extended position. The flanges $b$ of the sections $a\ a'$ are provided at those parts where they extend over the slots $d$ with inwardly-bent inclined lips $b'$, as shown clearly in Figs. 2 and 3, which serve to facilitate the passage of said flanges $b$ over the locking-springs $f$ when the sections are telescoped one within the other, said inclined lips $b'$ serving to press the locking-springs downward below the slots $d$, so as to release the connection of the adjoining sections with each other and facilitate the pushing in of the telescopic sections. In this manner the pushing home of the sections into the next adjoining sections is sufficient to press the locking-springs inwardly and release the same from the adjoining sections, as shown in Fig. 3. For extending the sections of the legs all that is required is to pull one section after the other in outward direction until they are stopped by the abutting of the flanges $b$ and collars and interlocked by the springs $f$, as shown in Fig. 2. The collars $e$ have beveled recesses corresponding in size to the lips $b'$, so as to permit the snug fitting of the flanges to the ends of the collars. In this manner an easily-operated telescopic tripod with extensible sections is obtained, that can be reduced to a very small size, and that combines considerable strength with lightness and convenience of use, so as to be easily carried about as required by amateur photographers, &c.

The tripod is also adapted for surveying-instruments of all kinds, and for other purposes in which a light, strong, and durable tripod is required.

Having thus described our invention, we claim as new and desire to secure by Letters Patent—

1. A tripod the legs of which are composed of tubular telescoping sections of sector-shaped cross-section, substantially as set forth.

2. A tripod the legs of which are made of tubular telescoping sections of sector-shaped cross-section, and devices for locking the said sections to each other when extended, substantially as set forth.

3. A tripod the legs of which are made of tubular telescoping sections, the upper and intermediate sections being provided with slots and inwardly-bent flanges, while the upper ends of the intermediate and lower sections are provided with slotted collars and locking-springs, substantially as set forth.

4. The combination of a tubular leg-section having a slot and an inwardly-bent flange at the lower ends, said flange having an inclined lip at one point thereof, a second tubular leg-section having a slotted collar at its upper end, and a locking-spring located in the slot of said collar and adapted to project through the slot of the first section, so as to interlock therewith or be released therefrom by the action of the inclined lip, substantially as set forth.

In testimony that we claim the foregoing as our invention we have signed our names in presence of two subscribing witnesses.

FERD. S. RUTTMANN.
GEORGE SINGER.

Witnesses as to Ferdinand S. Ruttmann:
MARTIN PETRY,
CHARLES FLEISCHACKER.

Witnesses as to George Singer:
FRANK P. SPROUL,
WILLIAM BEAL.